United States Patent
Wendt et al.

(10) Patent No.: US 7,443,052 B2
(45) Date of Patent: Oct. 28, 2008

(54) DC/DC CONVERTER AND DECENTRALIZED POWER GENERATION SYSTEM COMPRISING A DC/DC CONVERTER

(75) Inventors: Matthias Wendt, Würselen (DE); Peter Lürkens, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 66 days.

(21) Appl. No.: 10/585,369

(22) PCT Filed: Dec. 22, 2004

(86) PCT No.: PCT/IB2004/052888

§ 371 (c)(1),
(2), (4) Date: Jul. 5, 2006

(87) PCT Pub. No.: WO2005/076444

PCT Pub. Date: Aug. 18, 2005

(65) Prior Publication Data

US 2007/0165347 A1    Jul. 19, 2007

(30) Foreign Application Priority Data

Jan. 9, 2004    (EP) .................................. 04100050

(51) Int. Cl.
*H02J 1/10* (2006.01)
(52) U.S. Cl. ....................................................... 307/44
(58) Field of Classification Search ..................... 307/44
See application file for complete search history.

(56) References Cited

U.S. PATENT DOCUMENTS

| | | | | |
|---|---|---|---|---|
| 5,861,738 A | * | 1/1999 | Becker-Irvin et al. | 323/282 |
| 6,456,051 B2 | * | 9/2002 | Darzy | 323/284 |
| 6,671,193 B1 | * | 12/2003 | Pelkonen | 363/53 |

FOREIGN PATENT DOCUMENTS

| | | |
|---|---|---|
| DE | 40 32 569 A1 | 4/1992 |
| DE | 199 19 766 A1 | 11/2000 |
| EP | 1241778 * | 9/2002 |
| GB | 2238672 * | 6/1991 |

* cited by examiner

*Primary Examiner*—Robert L. Deberadinis

(57) ABSTRACT

The invention relates to a DC/DC converter for use in a decentralized power generation system. If a DC/DC converter is physically separated from a power receiving component and connected to such a power receiving component via a DC bus, a short-circuit on the DC bus may endanger the system and service personnel. In order to minimize such a risk, it is proposed that the DC/DC converter comprises a converting component for DC/DC converting a direct current supplied by a power generating unit and for supplying a resulting converted direct current to a DC bus, and that the DC/DC converter comprises in addition a control component arranged to monitor a voltage at the outputs of the DC/DC converter and to cause the converting component to enter a short-circuit protection mode if the monitored voltage lies below a predetermined voltage threshold. The invention relates equally to a corresponding system and to a corresponding method.

10 Claims, 6 Drawing Sheets

DC/DC CONVERTER AND DECENTRALIZED POWER GENERATION SYSTEM COMPRISING A DC/DC CONVERTER

The invention relates to a DC/DC converter for use in a decentralized power generation system, to a decentralized power generation system comprising such a DC/DC converter and to a method for use in a decentralized power generation system.

Decentralized power generation systems are known for example in the form of photovoltaic (PV) power plants.

Photovoltaic power is one of the most promising sources for renewable energy. In PV power plants, PV cells generate a direct current, which results in a low direct voltage of less than 1 V at each cell. Usually, a plurality of PV cells are therefore assembled in a PV module. Depending on the mode of implementation, such a PV module may have an output voltage of several tens of Volt and provide a power of 10 W to 150 W.

In some applications, for example in PV power plants which are arranged for feeding generated current into a public power supply system, the direct current provided by the PV modules is further converted by an inverter into an alternating current, as illustrated in FIG. 1.

FIG. 1 is a block diagram of a conventional PV power plant. The power plant comprises a first series connection of several PV modules 11 to 12 and a second series connection of several PV modules 13 to 14. The series connection of the PV modules 11 to 12 on the one hand and the series connection of the PV modules 13 to 14 on the other hand are arranged in parallel to each other between ground and a direct current (DC) bus 40. Moreover, an inverter 20 is connected on the one hand to the DC bus 40 and on the other hand to lines 50 of a public power supply system.

In such a system, various controlling tasks have to be taken care of.

In order to operate the PV modules 11 to 14 at an optimal operating point, advantageously a so-called MPP (Maximum Power Point) tracking is employed. The MPP tracking selects the input current to the inverter 20 such that the PV cells have their MPP. This MPP, however, is not fixed but varies, for example, with the intensity of the solar radiation, with the temperature and with the characteristics of the PV cells.

Moreover, the electrical power provided by the PV cells to the inverter 20 has to be adapted by the inverter 20 to the current voltage in the public power supply system, to the current frequency in the public power supply system and to the current phase in the in the public power supply system, before it is fed into the system. Supplementary circuits moreover take care of the safety of the operation and prevent, for instance, that the operation of the inverter 20 is continued if the voltage of the public power supply system fails, in order to prevent an isolated operation of the PV power plant.

In conventional PV power plants, the voltage adaptation at the input of the inverter and the inverter circuit itself are realized in a single device.

FIG. 2 is a block diagram of a conventional PV power plant using a central inverter unit 60. The PV power plant comprises a plurality of PV modules 11, 12, 13. Each of these PV modules 11, 12, 13 is connected, for example via a DC bus 40, to the inputs of the central inverter unit 60. Instead of a plurality of single PV modules 11, 12, 13, also a plurality of series connections of PV modules could be used, as shown in FIG. 1. Within the central inverter unit 60, the PV modules 11, 12, 13 are connected via a DC/DC converter 30 to the actual inverter 20. The outputs of the inverter 20 correspond to the outputs of the central inverter unit 60, which are connected to lines 50 of a public power supply system.

In case such a central inverter unit 60 is employed in a larger system, the MPP tracking can only be realized for the PV power plant as a whole. Consequently, there is no possibility of reacting flexibly to environmental influences limited to single or specific ones of the PV modules 11, 12, 13, for example a partial shadowing of the PV modules 11, 12, 13.

A further problem with a central inverter unit 60 is due to the high voltages and the high direct currents which have to be fed from the PV modules 11, 12, 13 to the central inverter unit 60. Currents exceeding some Ampere cannot be separated any more with simple fuzes in case of voltages exceeding 40 V. This implies that in case of sunshine, the PV power plant cannot be switched off on the direct current side. In addition, the PV modules 11, 12, 13 always provide a voltage as long as they are illuminated. That is, if they are not connected to a load, they provide nevertheless a no-load voltage. This has to be taken into account during assembly and maintenance of the PV power plant, in order to avoid accidents and damages.

In the publication DE 199 19 766 A1, it has been proposed to use a central inverter unit with a separate DC/DC converter for a respective series connection of PV modules. This allows a separate voltage adaptation and a separate MPP tracking for each series connection. The above described problem of high direct currents and no-load voltages, however, is not solved with this approach.

In other conventional PV power plants, several inverter units are employed, each comprising a DC/DC converter and an inverter. Each of these inverter units is then associated to another PV module or to another assembly of PV modules. The inverter units are usually mounted close to the associated PV module or assembly of PV modules, in order to avoid long direct-current paths. In practice, in particular PV power plants are offered, in which each PV module is provided with its own inverter unit, forming a so called module-inverter. Such a PV power plant has been presented for example in the publication DE 40 32 569 A1.

FIG. 3 is a block diagram of a conventional PV power plant using module-inverters. The depicted PV power plant comprises a first module-inverter 61, in which a first PV module 11 is connected via a first DC/DC converter 31 to a first inverter 21. The outputs of the inverter 21 are further connected to lines 50 of a public power supply system. The PV power plant comprises in addition a plurality of further module-inverters 62, 63, which are constructed and arranged in the same manner as the first module inverter 61 and which thus comprise a respective PV module 12, 13, a respective DC/DC converter 32, 33 and a respective inverter 22, 23.

It is a disadvantage of this PV power plant that each inverter 21, 22, 23 has to take care independently of the demands on feeding a current into the public power supply system. In some cases, even a surveillance of network failures and security circuits are implemented separately in each of the module-inverter 61, 62, 63. Moreover, the distributed inverters 21, 22, 23 have to be connected to a separate communication structure, if they have to be surveyed and/or controlled from a central location. In addition, the control algorithms in the inverters 21, 22, 23 may become unstable, when they cause each other to oscillate.

A further disadvantage of the PV power plant presented in FIG. 3 is the insufficient reliability of the inverters 21, 22, 23 resulting from the environmental strain when mounted on a roof top. An inverter 21, 22, 23 requires electrolyte capacitors for storing energy over the 50 Hz cycle of the voltage on the public power supply system, and such electrolyte capacitors are particularly sensitive to variations in temperature.

It has to be noted that similar problems may occur in other types of decentralized systems for power generation, which employ other decentralized power generating units than PV modules or assemblies of PV modules. Further, similar problems may equally occur if the energy generated by decentralized power generating units, like PV modules, is not to be used for feeding into a public power supply system but for some other purpose.

The invention proceeds from an alternative decentralized power generation system, which combines the advantages of different conventional decentralized power generation system and avoids at the same time their disadvantages. In this alternative system, a plurality of DC/DC converters is physically separated from the inverter, and each DC/DC converter is arranged close to a respective power generating unit. The DC/DC converters may then feed an available current into a DC bus, and a power receiving component may retrieve a required current from this DC bus. In such a system, high direct currents provided by the power generating units do not have to be transferred a long way to a power receiving unit, since the high direct currents can be converted at the location of the power generating units by the DC/DC converter associated to a respective power generating unit. Further, a particularly simple modular and extendible mounting of the system is enabled. Due to the separation of DC/DC converters and power receiving component, moreover those components of the system which are subject to adverse environmental conditions, for instance on a roof, can be constructed without electrolyte capacitors and thus in a way which ensures a long life and a high reliability. That is, only the DC/DC converters, which are arranged close to the power generating units, may be subject to adverse environmental conditions, while the usually more sensitive power receiving component can be arranged at a sheltered location. If the DC/DC converters are moreover requested to take care that a predetermined voltage on the DC bus is not exceeded, each DC/DC converter can be operated independently from a central control. A power receiving unit can further be designed such that it only retrieves power from the DC bus as long as the voltage on the DC bus does not decrease, which adapts the power retrieval automatically at each point of time to the current which is made available by the power generating units.

A problem may arise in such a system in the case of a short-circuit on the DC bus. In a short-circuit situation, a DC/DC converter will supply the maximum current to the DC bus which is made available by the associated power generating unit, since the predetermined voltage on the DC bus which is not allowed to be exceeded will not be reached. This may result in damages in the system and endanger service personnel.

It is an object of the invention to provide a DC/DC converter, a decentralized power generation system and a method, which avoid the described problem in case of a short-circuit.

A DC/DC converter for use in a decentralized power generation system is proposed, which comprises a converting component for DC/DC converting a direct current supplied by a power generating unit and for supplying a resulting converted direct current to a DC bus. The proposed DC/DC converter further comprises a control component arranged to monitor a voltage at the outputs of the DC/DC converter and to cause the converting component to enter a short-circuit protection mode if the monitored voltage lies below a predetermined voltage threshold.

Moreover, a decentralized power generation system is proposed, which comprises the proposed DC/DC converter and in addition at least one power generating unit for generating a direct current and a DC bus for making a supplied current available to a power receiving component, the DC/DC converter being connected between the at least one power generating unit and the DC bus.

Finally, a method of operating a DC/DC converter in a decentralized power generation system is proposed, wherein the DC/DC converter is arranged between a power generating unit and a DC bus. The method comprises the following steps:

monitoring a voltage at the outputs of the DC/DC converter;

if the monitored voltage exceeds a predetermined voltage threshold, DC/DC converting a direct current received from the power generating unit and feeding a resulting converted current to the DC bus; and if the monitored voltage lies below the predetermined voltage threshold, entering a short-circuit protection mode.

The invention is based on the idea that a short-circuit on the DC bus of a decentralized power generation system can be detected in a DC/DC converter by monitoring the voltage at its outputs, if the DC/DC converter is connected to the DC bus. If variations in the voltage on the DC bus can only be caused by variations in the power supplied by the power generating components, the regular range for the voltage on the DC bus can be limited, for example to 85% to 100% of a desired voltage. If the voltage on the DC bus falls below the lower limit of this range, a short-circuit situation can be considered to be a possible cause. It is therefore proposed that in this case, a DC/DC converter enters a short-circuit mode. Power receiving components retrieving current from the DC bus can usually only operate with an input voltage within a limited range predetermined by its design anyhow.

It is an advantage of the invention that it allows a protection of a decentralized power generation system and of service personnel in the case of a short-circuit in the system.

In one embodiment of the invention, the control component causes the converting component to leave the short-circuit mode again as soon as the monitored voltage raises above the predetermined voltage threshold. This has the advantage that the DC/DC converter will automatically continue with its regular operation when a short-circuit has been removed.

The short-circuit mode can be realized in various ways. Advantageously, it limits or reduces the total amount of current which is supplied to the DC bus so that the total amount of current is not dangerous for the service personnel and for the system. In one embodiment of the invention, the DC/DC converter outputs in the short-circuit mode repeatedly a current for a short time. In another embodiment of the invention, the DC/DC converter outputs in the short-circuit mode a current which is limited to a low maximum value. Both approaches allow to start operation of the system without further measures, even though it takes a certain time at such a start until the voltage on the DC bus reaches the predetermined threshold voltage. Since the output current is not reduced to zero, the predetermined threshold voltage will be reached after a while and the control component may then cause the converting component to switch to its regular operation.

It is also an advantage of the invention that it can be made use of for safe mounting of a decentralized power generation system and equally for switching off an operating decentralized power generation system or a part of an operating decentralized power generation system, simply by creating an artificial short-circuit. In particular the outputs of a DC/DC converter connected to the DC bus and/or the inputs of a power receiving component connected to the DC bus may be short-circuited to this end, for example by a short-circuit switch, like a crow bar, or by a short-circuit bridge. No additional components are required.

For example, each DC/DC converter may be connected to the DC bus by means of a plug connection including a short-circuiting component. The short-circuiting component is designed such that it short-circuits the outputs of the DC/DC converter automatically when the plug connection is opened and/or that it removes a short-circuit between the outputs of the DC/DC converter automatically when the plug connection is closed. Thereby, it can be ensured that a DC/DC converter can only output a critical voltage when it is safely connected to the DC bus.

If the system comprises a central short-circuiting component for generating a short-circuit on the DC bus, for instance at the inputs of a power receiving component, the entire system can be switched of in a simple way. Such a central short-circuiting component can also be controlled by a power receiving component connected to the DC bus. The power receiving component may then cause the central short-circuiting component to generate a short-circuit on the DC bus in case of a detected failure situation in the system.

The invention can be used in any decentralized energy generation system using a plurality of power generating units. The power generating units can comprise one or more PV modules or any other power generating modules. Different power generating units may even comprise different types of power generating modules, in particular if the DC bus has a predetermined operating voltage range which is observed by the DC/DC converters.

Moreover, the current fed by the plurality of DC/DC converters into the DC bus can be supplied to any desirable power receiving component. It can be supplied for instance to an inverter for converting the supplied direct current into an alternating current in accordance with specific requirements. The alternating current can then be fed for example into a public power supply system or be used as power supply in an isolated power supply system.

Alternatively, the current on the DC bus could also be retrieved, for example, by a charging controller for accumulators. In a system provided with accumulators, the DC bus could be used for supplying the charging current, but equally be used in de-charging cycles. That is, the energy provided by the power generating units via the DC bus could be supplied to some load and charge in parallel one or more accumulators via the charging controller. In case of a decreasing voltage on the DC bus, energy stored in the accumulators may then be fed back to the DC bus in order to enable the load to continuously retrieve energy from the DC bus.

In the following, embodiments of the invention will be described in more detail by way of example with reference to the accompanying drawings of which:

Figure 1:
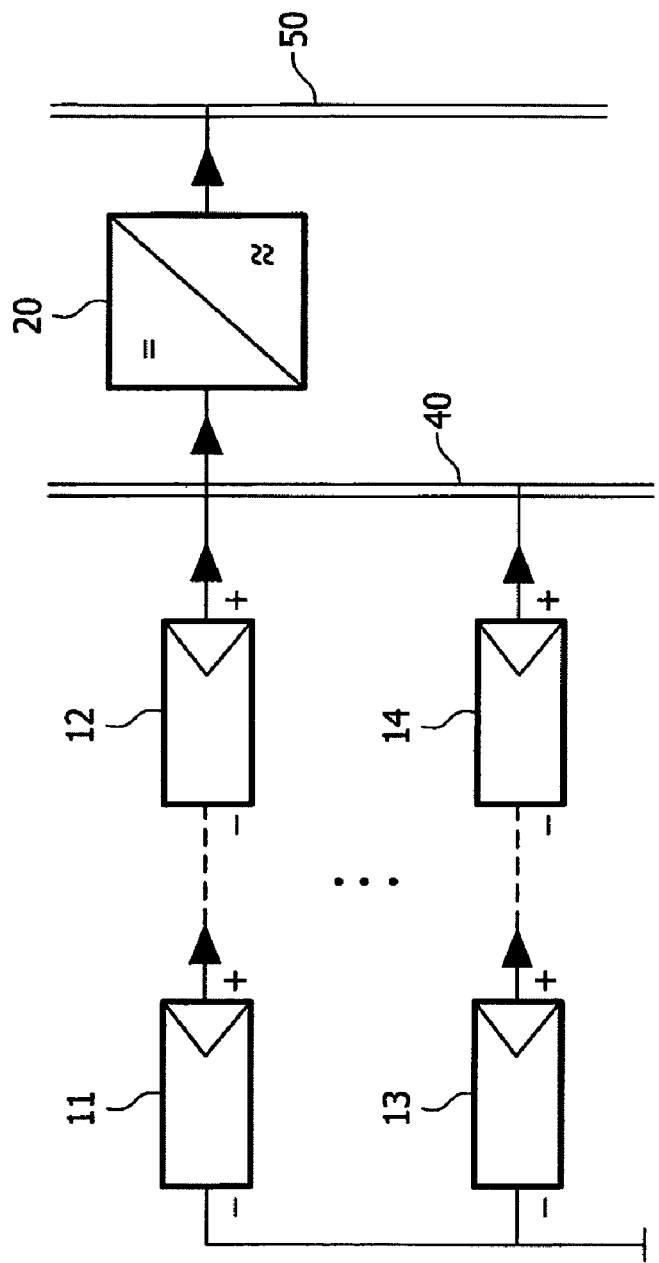
FIG. 1 is a block diagram showing a serial-parallel connection of PV modules in a conventional PV power plant.
Figure 2:
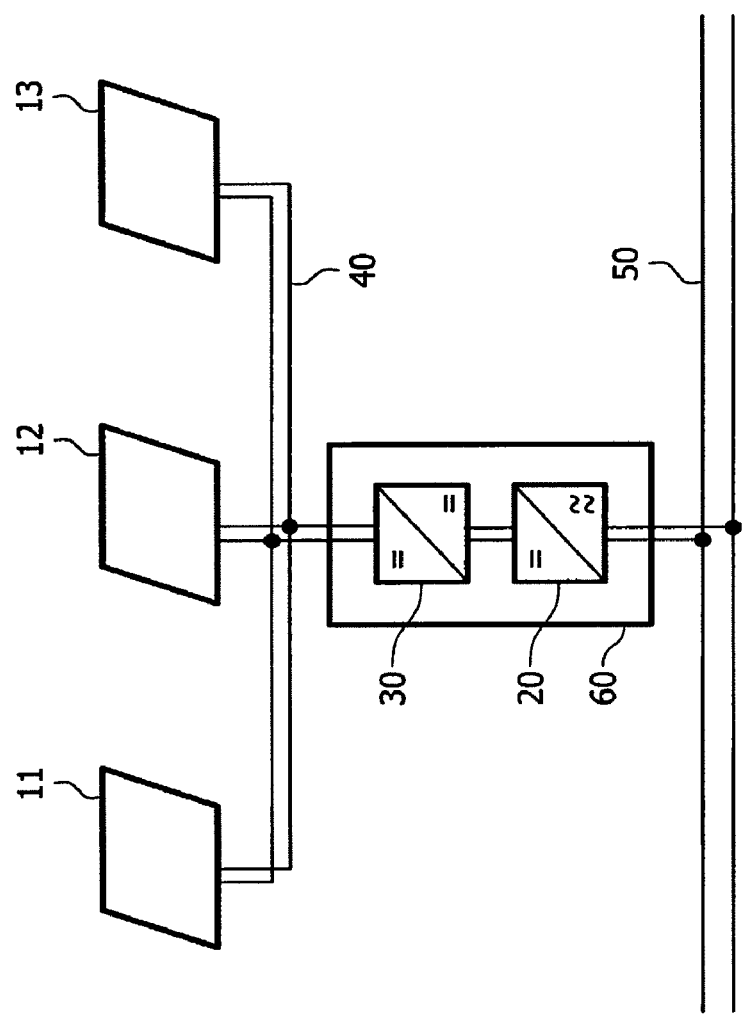
FIG. 2 is a block diagram of a conventional PV power plant using a centralized inverter.
Figure 3:
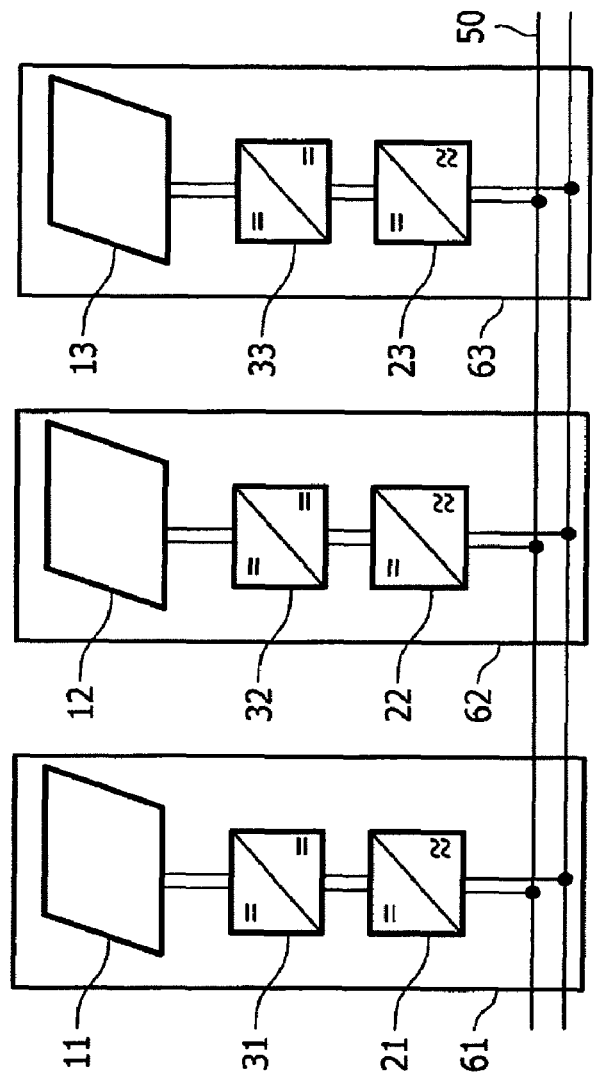
FIG. 3 is a block diagram of a conventional PV power plant using module-inverters.
Figure 4:
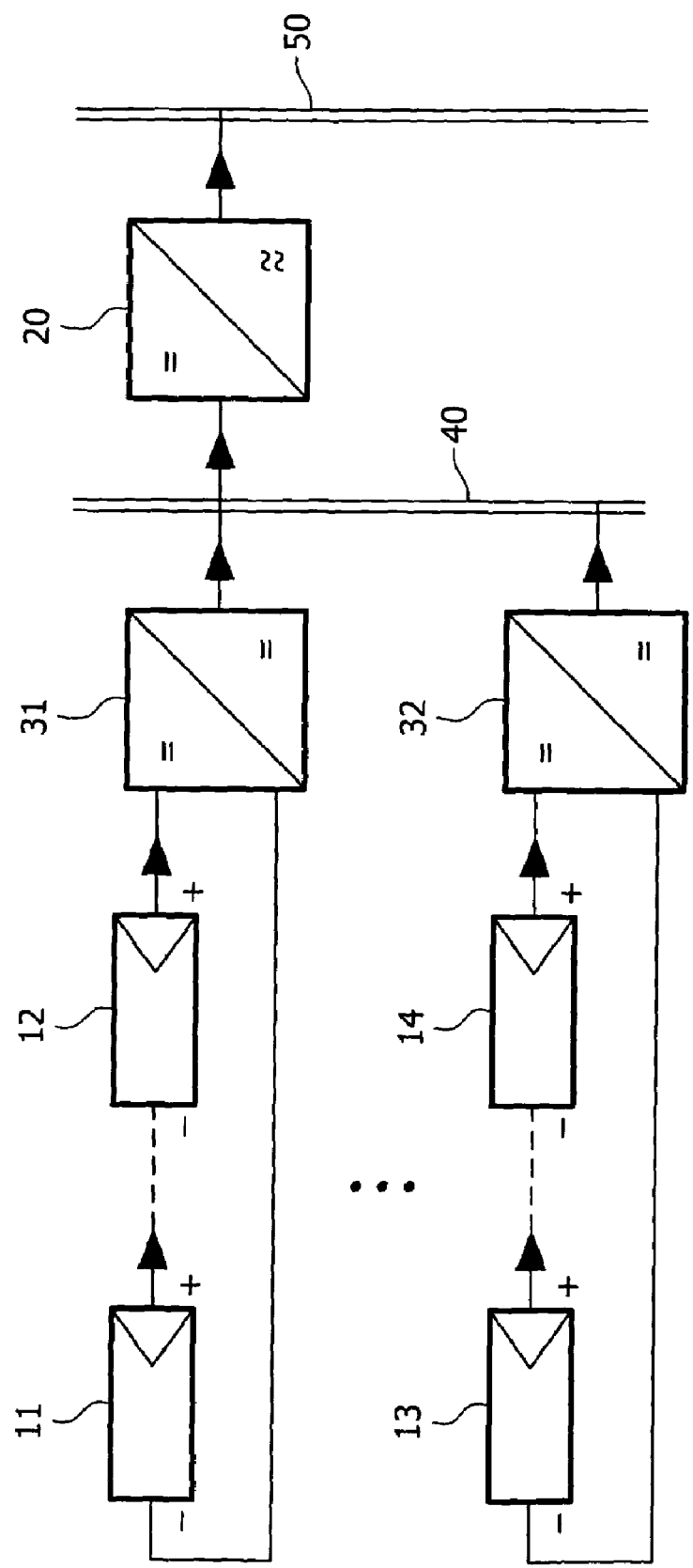
FIG. 4 is a block diagram of an improved PV power plant in which the invention can be implemented.

FIG. 4 presents by way of example a PV power plant as a decentralize power generation system in which the invention may be implemented. An exemplary implementation of the invention in this PV power plant will be described with reference to FIGS. 5 and 6.

The PV power plant of FIG. 4 comprises a first series connection of PV modules 11, 12. Both ends of this first series connection are connected to the inputs of a first DC/DC converter 31. The PV power plant further comprises a second series connection of PV modules 13, 14. Both ends of this second series connection are connected to the inputs of a second DC/DC converter 32. The respective outputs of the DC/DC converters 31, 32 are connected to the lines of a common DC bus 40. Further PV modules can be connected in the same way via separate DC/DC converters to the DC bus 40. The PV power plant finally comprises an inverter 20. The inputs of the inverter 20 are equally connected to the lines of the DC bus 40, while the outputs of the inverter 20 are connected to lines 50 of a public power supply system.

The PV-modules 11 to 14 produce a current depending on a respective intensity of illumination.

The DC/DC converters 31, 32 survey the voltage provided by the respectively connected PV modules 11 to 14. As soon as a first predetermined voltage threshold is reached or exceeded by the voltage supplied by a specific series connection of PV modules 11 to 14, the associated DC/DC converter 31, 32 carries out a voltage conversion. Using the conventional MPP tracking, the input current to this DC/DC converter 31, 32 is set such that the connected PV modules 11 to 14 are operated in the bend of the characteristic curve, i.e. in the MPP. The MPP tracking is thus performed separately for each series connection of PV modules 11 to 14.

The output power of the DC/DC converters 31, 32 is supplied to the DC bus 40. Two requirements determine the amount of power which each DC/DC converter 31, 32 is allowed to supply to the DC bus 40. As a first requirement, the output voltage of the DC/DC converters 31, 32 is set to a predetermined bus voltage, which is the same for each DC/DC converter 31, 32 of the entire PV power plant. As a second requirement, the current provided by a DC/DC converter 31, 32 is not allowed to exceed a predetermined maximum value. This maximum value can be different for each DC/DC converter 31, 32 and should be selected depending on the maximum power of the respectively connected PV modules 11 to 14. Thus, a DC/DC converter 31, 32 supplies energy to the DC bus 40 only if its output current is below a current threshold predetermined for this DC/DC converter 31, 32 and if the supply of energy does not increase the voltage on the DC bus 40 above the predetermined bus voltage as second predetermined voltage threshold.

The inverter 20, which is connected to the DC bus 40, recognizes that at least one of the DC/DC converters 31, 32 is operating, if the predetermined bus voltage is available on the DC bus 40. If the predetermined bus voltage is available on the DC bus 40 and if a surveillance of the voltage on the lines 50 of the public power supply system currently allows such a supply, the inverter 20 may convert current retrieved from the DC bus 40 into an alternating current having a required frequency and a required code phase, and feed this alternating current into the lines 50 of the public power supply system.

The more energy is fed by the inverter 20 into the public power supply system, the higher rises the current on the DC bus 40, as the DC/DC converters 31, 32 may supply more energy without raising the voltage on the DC bus 40. Only when all DC/DC converters 31, 32 have reached their maximum load, the voltage on the DC bus 40 starts to drop. This is a signal to the inverter 20 to reduce the energy supplied to the public power supply system. The inverter 20 thus learns indirectly via the voltage on the DC bus 40 that the energy supplied to the public power supply system is too high compared to the energy generated in the PV modules 11 to 14 and that the supply has to be reduced. When the inverter 20 reaches its maximum supply power before the voltage on the DC bus 40 drops, no problem will occur, since the DC/DC converters 31, 32 are not enabled to increase the voltage on the DC bus 40.

With the described control mechanism, the DC/DC converters 31, 32 can be controlled independently from each other and at the same time, long high direct current paths between the power generating units 11 to 14 and the DC/DC converters 31, 32 are avoided.

Figure 5:
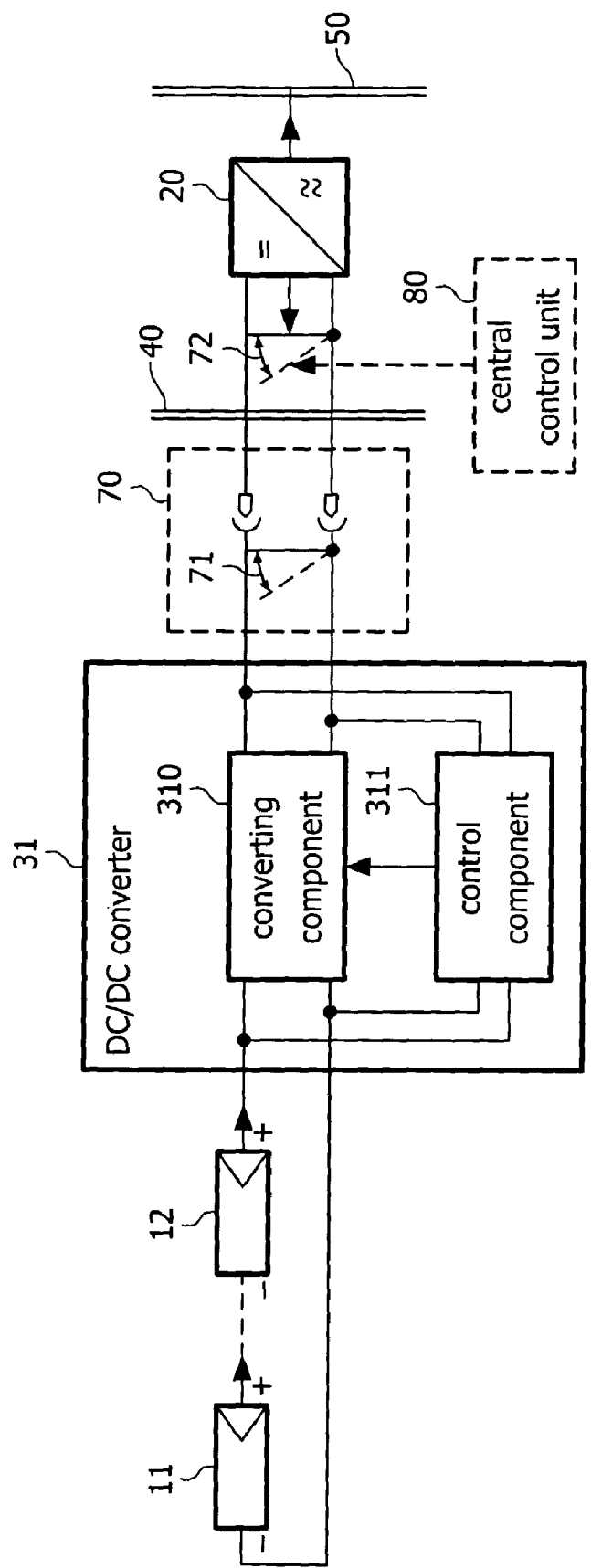
FIG. 5 is a block diagram showing details of an exemplary implementation of the invention in the PV power plant of FIG. 4.

FIG. 5 is a block diagram of a part of the PV power plant of FIG. 4 including the inverter 20, the DC bus 40, one representative DC/DC converter 31 and one representative series connection of PV modules 11, 12. The series of PV modules 11, 12 is connected via the DC/DC converter 31, the DC bus 40 and the inverter 20 to the lines 50 of a public power supply system, just as in FIG. 4.

The DC/DC converter 31 is shown to comprise in more detail a converting component 310 and a control component 311. The inputs of the DC/DC converter 31 are connected to inputs of the converting component 310, while outputs of the converting component 310 are connected to the outputs of the DC/DC converter 31. The control component 310 is arranged to monitor the voltage across the inputs of the converting component 310 and to monitor the voltage across the outputs of the converting component 310.

The DC/DC converter 31 is connected to the DC bus 40 via a plug 71. The plug 70 comprises on the side of the DC/DC converter 31 a short-circuit switch 71, for instance a crowbar, for connecting the two output lines of the DC/DC converter 31. The short-circuit switch 71 is constructed and arranged such that it automatically disconnects the two output lines of the DC/DC converter 31 when the plug 70 is connected and that it automatically connects the two output lines of the DC/DC converter 31 when the plug 70 is disconnected.

All other DC/DC converter 32 in the PV power plant not shown in FIG. 5 is constructed and arranged in a corresponding manner.

A further a short-circuit switch 72, for instance again a crowbar, is provided for short-circuiting the inputs of the inverter 20. The inverter 20 has a controlling access to the short-circuit switch 72. The short-circuit switch 72 is constructed and arranged such that it can be caused manually to connect and disconnect the inputs of the inverter 20, and moreover such that it can be caused in addition by the inverter 20 to connect and disconnect the inputs of the inverter 20. Alternatively, a central control unit 80 may have a corresponding controlling access to the short-circuit switch 72, as indicated in FIG. 5 with dashed lines.

Figure 6:
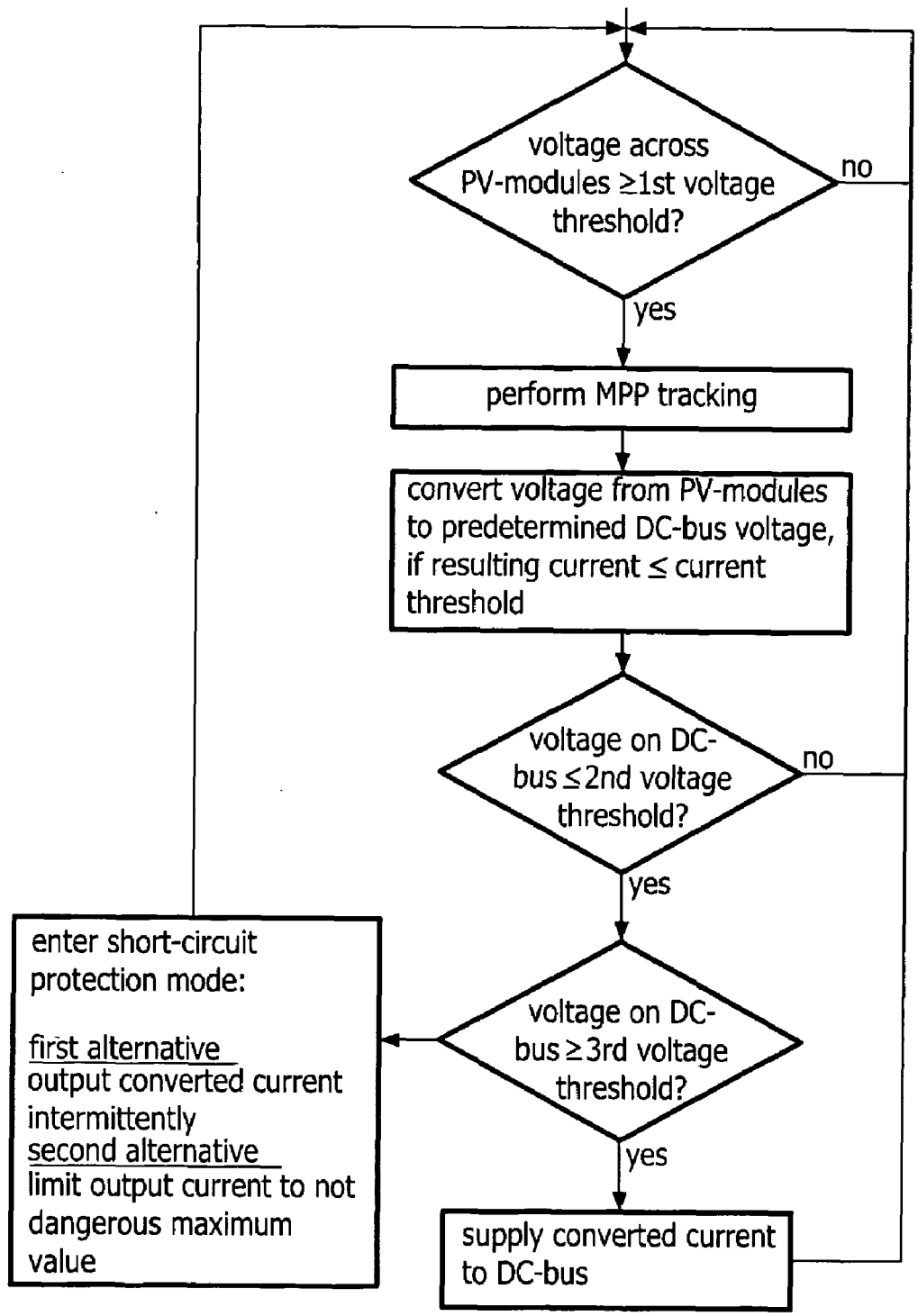
FIG. 6 is a flow chart illustrating the operation in the PV power plant of FIG. 5.

The general operation of the PV power plant has already been described above with reference to FIG. 4. Further details of the operation in accordance with the invention will now be explained with reference to FIG. 6. FIG. 6 is a flow chart illustrating specifically the operation in the DC/DC converter 31 of FIG. 5.

The control component 311 of the DC/DC converter 31 monitors the voltage which is applied to the DC/DC converter 31 by connected PV modules 11 to 12. As soon as the first predetermined voltage threshold is reached or exceeded by the voltage supplied by the PV modules 11 to 12, the control component 311 causes the converting component 310 to carry out a DC/DC conversion, if the resulting current lies below the predetermined current threshold. The resulting current may be monitored as well by the control component 311. Using the conventional MPP tracking, the input current to the converting component 311 is set such that the connected PV modules 11 to 12 are operated in the MPP.

The control component 311 further monitors the voltage at the output of the DC/DC converter 31, that is, the voltage on the DC bus 40. Only if the voltage on the DC bus 40 is smaller than or equal to the predetermined bus voltage as second voltage threshold, the process is continued.

On the other hand, if the voltage on the DC bus 40 is considerably smaller than the predetermined bus voltage, there is possibly a short-circuit on the DC bus. The control component 311 therefore determines in addition whether the voltage on the DC bus 40 lies below a third predetermined voltage threshold which is smaller than the second predetermined voltage threshold, for example 85% of the second predetermined voltage threshold. If the control component 311 detects that the voltage on the DC bus 40 lies below this third predetermined voltage threshold, it causes the converting component 310 to enter a short-circuit protection mode.

In a first exemplary alternative of such a short-circuit protection mode, the converting component 310 repeatedly outputs the converted current, but only for a short duration at a time, while the control component 311 continues monitoring the voltage on the DC bus 40. If the voltage on the DC bus 40 does not raise above the third predetermined voltage threshold during a respective time period in which the converted current is output, the intermittent output of the converted current is continued. The short duration of time during which the current is output is selected such that as soon as the short-circuit is removed in the PV power plant, the current is able in one or several cycles to charge an input capacity (not shown) of the inverter 20 to a voltage lying above the third predetermined voltage threshold.

In a second exemplary alternative of the short-circuit protection mode, the converting component 310 outputs a current which is limited to a not dangerous maximum value, while the control component 311 continues monitoring the voltage on the DC bus 40. As soon as the control component 311 determines that the voltage on the DC bus 40 lies above the third predetermined voltage threshold, which indicates that the short-circuit in the PV power plant has been removed, the control component 311 allows the converting component 310 to output the entire converted current.

Both short-circuit protection mode alternatives are designed such that the PV power plant is not endangered by exceedingly high currents during a short-circuit on the DC bus 40 and that service personnel trying to remove the short-circuit is not exposed to danger. With both short-circuit protection mode alternatives, the DC/DC converter 31 is further designed such that after the short-circuit has been removed in the PV power plant, it will automatically continue with the regular operation.

The PV power plant starts operating as soon as the extend of illumination of the PV modules 11, 12 is sufficient. At such a start, the voltage on the DC bus 40 will not reach the third predetermined voltage threshold immediately. With both short-circuit protection mode alternatives, it is ensured that the PV power plant does not remain tracked in a presumed short-circuit on the DC bus 40.

The proposed construction of the DC/DC converter 31 can also be made use already when mounting the PV power plant of FIG. 5 by creating an artificial short-circuit situation by means of the short-circuit switches 71, 72.

Before the PV power plant is mounted, the short-circuit switch 72 associated to the inverter 20 is closed. The short-circuit switch 71 in the plug 70 associated to the DC/DC converter 31 is closed automatically, as long as the plug 70 is disconnected. The PV power plant can then be mounted without danger to the mounting personnel, since no current will be provided to the DC bus 40 as long as the voltage at the output of the DC/DC converter 31 cannot reach the third predetermined voltage threshold due to the artificial short-circuits. Due to the construction of the DC/DC converter 31 according to the invention, the short-circuits do not endanger the PV modules 11, 12 or the DC/DC converters 31 either. When connecting the DC/DC converter 31 to the DC bus 40 via the plug 70, the short-circuit switch 71 is opened automatically. The same applies to any other DC/DC converter 32 which is connected to the DC bus 40. When the mounting is completed and a danger of contact is no longer given, the mounting personnel opens manually the short-circuit switch 72 associated to the inverter 20. Only when the last short-circuit switch 72 has been opened, the PV power plant can start to operate.

The operation of a particular DC/DC converter 31 of the PV power plant can be interrupted again thereafter by opening the plug 70 connecting the DC/DC converter 31 to the DC bus 40, since this causes an automatic closing of the short-circuit switch 71 in the plug 70. The operation of the PV power plant as a whole can be interrupted by manually closing the short-circuit switch 72. Such intentionally caused interruptions may be useful for maintenance purposes or for an enlargement of the PV power plant. The operation of the entire PV power plant can moreover be interrupted automatically by the inverter 20 or by a central control unit 80 in case of detected failures in the PV power plant. This approach allows to protect the PV power plant for example from insulation burning.

In a simpler embodiment, the PV power plant might not include fixedly installed short-circuit switches 71, 72. In this case, the output of each DC/DC converter 31 and/or the input of the inverter 20 may be short-circuited manually by short-circuit bridges before mounting of the PV power plant. When the mounting has been completed, the short-circuit bridges are then simply removed.

It is understood that the described embodiments of the invention represents only some of a great variety of possible embodiments of the invention.

The invention claimed is:

1. DC/DC converter for use in a decentralized power generation system comprising:—a converting component for DC/DC converting a direct current supplied by a power generating unit and for supplying a resulting converted direct current to a DC bus; and—a control component arranged to monitor a voltage at the outputs of said DC/DC converter and to cause said converting component to enter a short-circuit protection mode if said monitored voltage lies below a predetermined voltage threshold, wherein the direct current is set so the power generating unit operates in the Maximum Power Point.

2. DC/DC converter according to claim 1, wherein said control component is further arranged to cause said converting component to exit an entered short-circuit protection mode again, if said monitored voltage raises above said predetermined voltage threshold.

3. DC/DC converter according to claim 1, wherein said converting component is adapted to output a converted direct current repeatedly only for a short duration at a time in said short-circuit protection mode.

4. DC/DC converter according to claim 1, wherein said converting component is adapted to output a current limited to a predetermined maximum value in said short-circuit protection mode.

5. DC/DC converter according to claim 1, further comprising a short-circuiting component for temporarily short-circuiting the outputs of said DC/DC converter whenever said outputs are to be free of voltage.

6. Decentralized power generation system comprising:—at least one power generating unit for generating a direct current;—a DC bus for making a supplied current available to a power receiving component; and—at least one DC/DC converter connected between said at least one power generating unit and said DC bus, said DC/DC converter including a converting component for DC/DC converting a direct current supplied by said at least one power generating unit and for supplying a resulting converted direct current to said DC bus, and said DC/DC converter further including a control component arranged to monitor a voltage at the outputs of said DC/DC converter and to cause said converting component to enter a short-circuit protection mode if said monitored voltage lies below a predetermined voltage threshold, wherein the direct current is set so the power generating unit operates in the Maximum Power Point.

7. Decentralized power generation system according to claim 6, further comprising at least one plug connection for connecting said at least one DC/DC converter to said DC bus, which plug connection comprises a short-circuiting component short-circuiting the outputs of said DC/DC converter automatically when said plug connection is opened and/or removing a short-circuit between the outputs of said DC/DC converter automatically when said plug connection is closed.

8. Decentralized power generation system according to claim 6, further comprising a central short-circuiting component for generating a short-circuit on said DC bus.

9. Decentralized power generation system according to claim 8, further comprising a power receiving component connected to said DC bus and adapted to cause said central short-circuiting component automatically to generate a short-circuit on said DC bus in case of a detected failure situation in said decentralized power generation system.

10. Method of operating a DC/DC converter in a decentralized power generation system, wherein said DC/DC converter is arranged between a power generating unit and a DC bus, said method comprising:—monitoring a voltage at the outputs of said DC/DC converter;—if said monitored voltage exceeds a predetermined voltage threshold, DC/DC converting a direct current received from said power generating unit and feeding a resulting converted current to said DC bus; and—if said monitored voltage lies below said predetermined voltage threshold, entering a short-circuit protection mode, wherein the direct current is set so the power generating unit operates in the Maximum Power Point.

* * * * *